US012753026B2

(12) United States Patent
Toro

(10) Patent No.: US 12,753,026 B2
(45) Date of Patent: Oct. 6, 2026

(54) SORTING MACHINE FOR SLABS

(71) Applicant: SYSTEM CERAMICS S.P.A., Fiorano Modenese (IT)

(72) Inventor: Andrea Toro, Fiorano Modenese (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 0 days.

(21) Appl. No.: 18/847,767

(22) PCT Filed: Apr. 3, 2023

(86) PCT No.: PCT/IB2023/053344
§ 371 (c)(1),
(2) Date: Sep. 17, 2024

(87) PCT Pub. No.: WO2023/194871
PCT Pub. Date: Oct. 12, 2023

(65) Prior Publication Data

US 2025/0197137 A1 Jun. 19, 2025

(30) Foreign Application Priority Data

Apr. 4, 2022 (IT) ........................ 102022000006620

(51) Int. Cl.
*B65G 49/06* (2006.01)
*B65G 47/91* (2006.01)

(52) U.S. Cl.
CPC ......... *B65G 49/067* (2013.01); *B65G 47/914* (2013.01); *B65G 49/061* (2013.01); *B65G 2201/022* (2013.01)

(58) Field of Classification Search
CPC ................ B65G 49/067; B65G 47/914; B65G 49/061; B65G 2201/022; B65G 1/0464;
(Continued)

(56) References Cited

U.S. PATENT DOCUMENTS 4,735,539 A * 4/1988 Hakkinen ................. B66F 9/07 414/277
7,309,204 B2 * 12/2007 Dorner ..................... B25J 9/047 901/29
(Continued)

FOREIGN PATENT DOCUMENTS

CN 104071580 10/2014
DE 9013814 U1 12/1990
(Continued)

OTHER PUBLICATIONS

International Search Report and Written Opinion issued in PCT/IB2023/053344 on Jun. 28, 2023, 10 pages.

*Primary Examiner* — Gregory W Adams
(74) *Attorney, Agent, or Firm* — Chrisman Gallo Tochtrop LLC

(57) ABSTRACT

Sorting machine for slabs—that includes a conveying plane arranged to move slabs along a conveying direction, a manipulator device arranged to grasp and release a slab and to move the slab between the conveying plane and one or more sorting stations. The manipulator device has a carriage that is movable along a substantially horizontal sliding direction, an elevator associated with the carriage and movable along a substantially vertical direction, a gripping device associated with the elevator, which is provided with a means for gripping at least one slab. The gripping device rotates around a substantially horizontal rotation axis and is movable along a transverse direction that is substantially horizontal and perpendicular to the sliding direction.

13 Claims, 8 Drawing Sheets

(58) Field of Classification Search
CPC ................ B65G 47/907; B65G 1/0407; B65G 1/0457; B66C 1/32; B66C 19/00; B66C 19/002; B66C 19/005; B25J 15/0616; B25J 15/0052; B25J 9/026
USPC ................................. 414/626, 627, 793, 797
See application file for complete search history.

(56) References Cited

U.S. PATENT DOCUMENTS

| | | | | |
|---|---|---|---|---|
| 8,788,086 B2 * | 7/2014 | Franz | B65G 49/061 | |
| | | | 700/218 | |
| 8,857,877 B2 * | 10/2014 | Lin | B25J 15/0052 | |
| | | | 901/14 | |
| 10,407,257 B2 * | 9/2019 | Toro | B65G 57/04 | |
| 2020/0018059 A1 * | 1/2020 | Barlow | E04G 21/167 | |

FOREIGN PATENT DOCUMENTS

| | | | | |
|---|---|---|---|---|
| DE | 102012111669 A1 * | 6/2014 | B65G 49/064 | |
| IT | 20090189 | 3/2011 | | |
| IT | 201900004129 | 9/2020 | | |
| IT | 201900004129 A1 * | 9/2020 | B65G 49/085 | |
| WO | WO-2004080861 A1 * | 9/2004 | B65G 47/914 | |
| WO | WO-2011039700 A1 * | 4/2011 | B28D 7/046 | |
| WO | 2012037582 A1 | 3/2012 | | |
| WO | WO-2013186713 A1 * | 12/2013 | B66C 17/06 | |

* cited by examiner

SORTING MACHINE FOR SLABS

The present invention relates to a sorting machine for slabs. In particular, but not exclusively, the invention finds useful use for sorting large-sized ceramic slabs.

In the ceramic tile production sector, a technology that allows to realize large-format slabs, up to 4000×2000 mm is now consolidated.

As part of the overall production cycle, the slabs must be stored, waiting to be sent to subsequent processing or to be transported to the end user or to a point of sale.

To this end, the use of temporary supports in the form of stands, provided with a median sidewall that rises from a rest base is known. The slabs are arranged with one side resting on the base of the temporary support, and reclined to rest on the median sidewall, so as to assume a position close to vertical. The stands are then transported to the intended destinations.

In general, a sorting machine comprises a conveying device, structured to lead the slabs to a pick-up station. Typically, the conveying device comprises a movable plane on which the slabs are conveyed in a substantially horizontal position. In the pick-up station there is arranged an equipment that picks up the slabs from the conveying device and places them in a predefined position, for example on a stand placed at the edge of the conveying device. Such equipment generally comprises an anthropomorphic robotic arm.

As is known, the anthropomorphic robotic arms are rather expensive and cumbersome devices, especially if they are intended to handle heavy objects, such as the large-format ceramic slabs. In such cases, the robotic arms must be structured in a particularly resistant way, to withstand the static and dynamic loads to which they are subjected, with a further increase in costs.

Object of the present invention is to offer a sorting machine for slabs, capable of handling large-sized ceramic slabs, without requiring the use of an anthropomorphic robotic arm.

The main advantage of the sorting machine according to the present invention is that it is much lighter and faster than currently available devices.

Another advantage of the sorting machine according to the present invention is that it is much more versatile than the currently available devices, since it is able to handle slabs of different sizes substantially without requiring adaptation interventions.

Additional features and advantages of the present invention will become more apparent from the detailed following description of an embodiment of the invention in question, illustrated by way of non-limiting example in the appended figures, in which.

Figure 1:
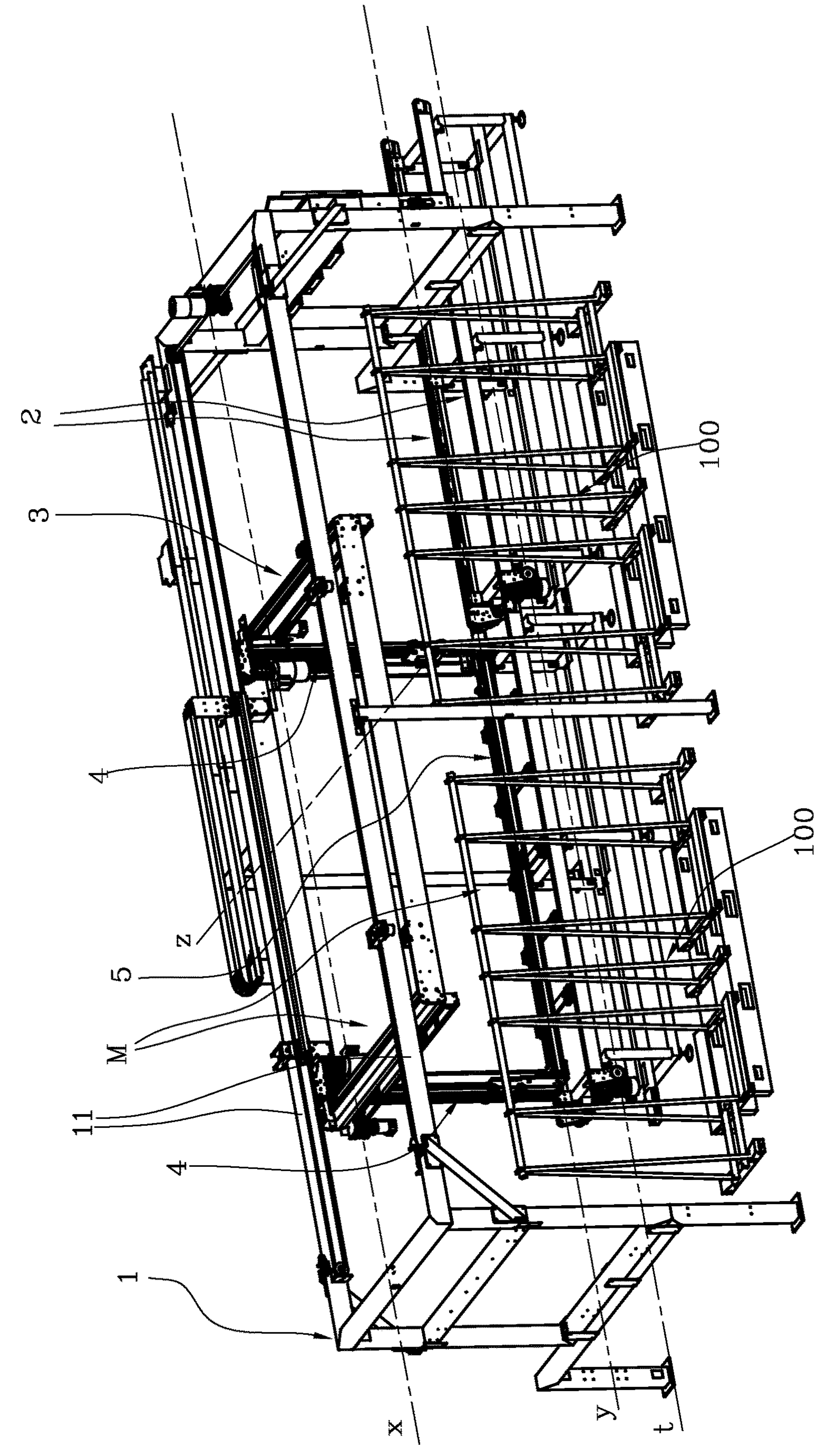
FIG. 1 shows an isometric view of the sorting machine according to the present invention.

In the following description, generic reference will be made to slabs (L), understood as products provided with two opposing rectangular main surfaces, delimited by sides whose length is much greater than the thickness of the slab, understood as the distance that separates the two main surfaces.

In the case of ceramic slabs, one of the two main surfaces is the laying surface, that is the surface intended to be coupled to the support structure, typically by means of specific mortars or adhesives, the other one is the visible surface, intended to remain exposed after laying the slab.

In the following description, reference will also be made to motors for the movement and/or rotation of various components of the sorting machine, without describing them in detail. The term motor is intended to mean an actuator capable of causing the movement of one part or component with respect to another part or component, with or without interposition of a kinematic mechanism, which may for example comprise gears, belts, rollers or other transmission systems well known in the sector. The motor is preferably an electric motor, possibly provided with an encoder to allow a precise control thereof by a main processor. This main processor coordinates the activations of the various motors between them in order to obtain pre-established movements.

In addition, in the following description reference will be made to sliding guides, not described in detail, used to facilitate the relative sliding between its parts or components of the sorting machine. The term sliding guide is intended to mean a device, well known in the sector, structured to be interposed between two parts or components intended to slide or rotate with respect to each other. The sliding guides used in the sorting machine according to the present invention may be with rollers, wheels, balls, skids or other equivalent configurations, all known in the sector.

The sorting machine for slabs according to the present invention comprises a manipulator device (M), arranged to grasp and release a slab (L), and to move the slab (L) between at least two pre-established positions.

In the depicted, preferred but not exclusive embodiment, the manipulator device is arranged to move the slab (L) between a conveying plane (2), movable along a conveying direction (t), and one or more sorting stations (100).

In particular, in a typical operating cycle of the sorting machine, a series of slabs (L) is fed to the manipulator device (M) by means of a conveying plane (2) that is movable along a substantially horizontal conveying direction (t). The manipulator device (M) picks up the slabs (L) from the conveying plane (2) and moves them to respective sorting stations (100), chosen based on pre-established sorting criteria. In the following description, reference will be made to the typical operating cycle of the sorting machine, without thereby excluding a reverse operating cycle, in which the manipulator device (M) picks up the slabs (L) from the respective sorting stations (100) and leads them to the conveying plane (2), depositing them on the latter in succession.

The criteria for choosing and sorting the slabs (L) can be the most disparate. For example, the slabs (L) can be sorted and grouped together based on the colour, the actual sizes, the presence of more or less marked defects. For the parameter chosen for sorting to be evaluated, a system for viewing and the analysis of the slabs (L) can be arranged along the conveying plane (2), upstream of the manipulator device. This viewing and analysis system is known in the industry in some different ways of implementation, and is connected to the main computer that governs the operation of the sorting machine.

In the depicted embodiment, the sorting stations (100) have stands of known type, structured to support a certain number of slabs (L) in a slightly inclined position with respect to the vertical. In other embodiments, the sorting stations (100) could be defined by horizontal rest planes, such as for example pallets or the like, or further conveying planes, directed towards other stations of the plant. In essence, the sorting machine according to the present invention is capable of operating with sorting stations (100) of any conformation.

In the depicted embodiment, the conveying plane (2) comprises a belt conveyor, known in the sector. In summary, the conveying plane (2) comprises a pair of motorised belts, closed in a loop around a path defined by a series of pulleys. Along at least one upper section of the followed path, the belts lie on a horizontal plane and are parallel to each other and to the conveying direction (t). The embodiment of the conveying plan (2) is however not relevant for the purposes of the present invention, and could be structured in a different way, known in the sector. For example, the conveying plane (2) could comprise a motorised roller conveyor or a motorised belt.

The manipulator device (M) comprises a carriage (3) that is movable along a substantially horizontal sliding direction (X). Preferably, but not necessarily, the sliding direction (X) is parallel to the conveying direction (t). The manipulator device (M) further comprises an elevator (4), movable along a substantially vertical direction, which is associated with the carriage (3). The manipulator (M) also comprises a gripping device (5), associated with the elevator (4) and provided with gripping means (51) for gripping at least one slab (L). The gripping device (5) is then movable along said substantially vertical direction by the elevator (4).

The gripping device (5) rotates around a substantially horizontal rotation axis (Y). Preferably, but not necessarily, the rotation axis (Y) is substantially parallel to the sliding direction (X). Furthermore, the gripping device (5) is movable along a transverse direction (Z), that is substantially horizontal and perpendicular to the sliding direction (X).

The configuration of the manipulator device (M) allows the gripping device (5) to be moved with considerable freedom within a preset working space. This working space is substantially defined by the stroke available for the carriage (3) along the sliding direction (X), by the stroke available for the elevator (4) along the transverse direction (Z) and by the stroke available for the gripping device (5) along the vertical direction. In practice, the gripping device can reach any position defined by three coordinates corresponding to three intermediate points of the strokes available for the carriage (3) along the sliding direction (X), for the elevator (4) along the transverse direction (Z) and for the gripping device (5) along the vertical direction. Furthermore, the gripping device (5) can be oriented in a desired manner about the rotation axis (Y). In fact, thanks to the coordinated combination of the movements of the carriage (3), of the elevator (4) and of the gripping device (5) it is possible to obtain a movement of a slab (L) supported by the gripping device (5) that is completely equivalent to the movement that could be obtained with an anthropomorphic robotic arm.

In particular, the gripping device (5) is arranged to translate along the transverse direction (Z). This allows the sorting stations (100) to be positioned next to the conveying plane (2), as shown in the figures. In other words, thanks to the capability of the gripping device (5) to translate along the transverse direction (Z), it is possible to arrange one or more sorting stations (100) next to the conveying plane (2). The sorting stations (100) placed next to the conveying plane (2) remain substantially within the overall dimensions lengthwise of the conveying plane (2), i.e. within the overall dimensions of the conveying plane (2) measured along the conveying direction (t). This makes it possible to reduce the overall dimensions of the sorting machine along the conveying direction (t), in a particularly advantageous compact configuration.

Figure 2:
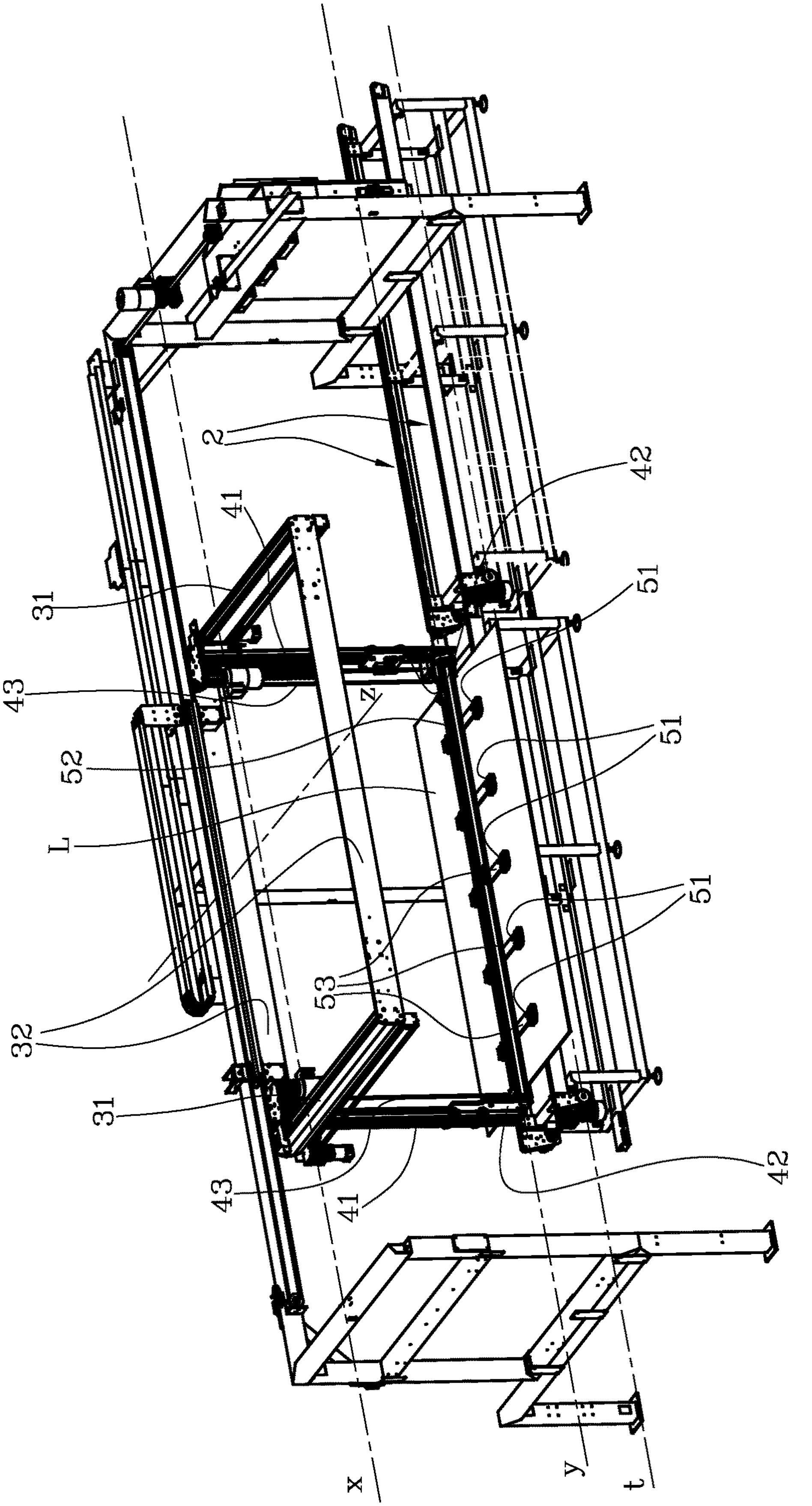
FIGS. 2 to 8 show a sequence of operating steps of the sorting machine according to the present invention.
Figure 3:
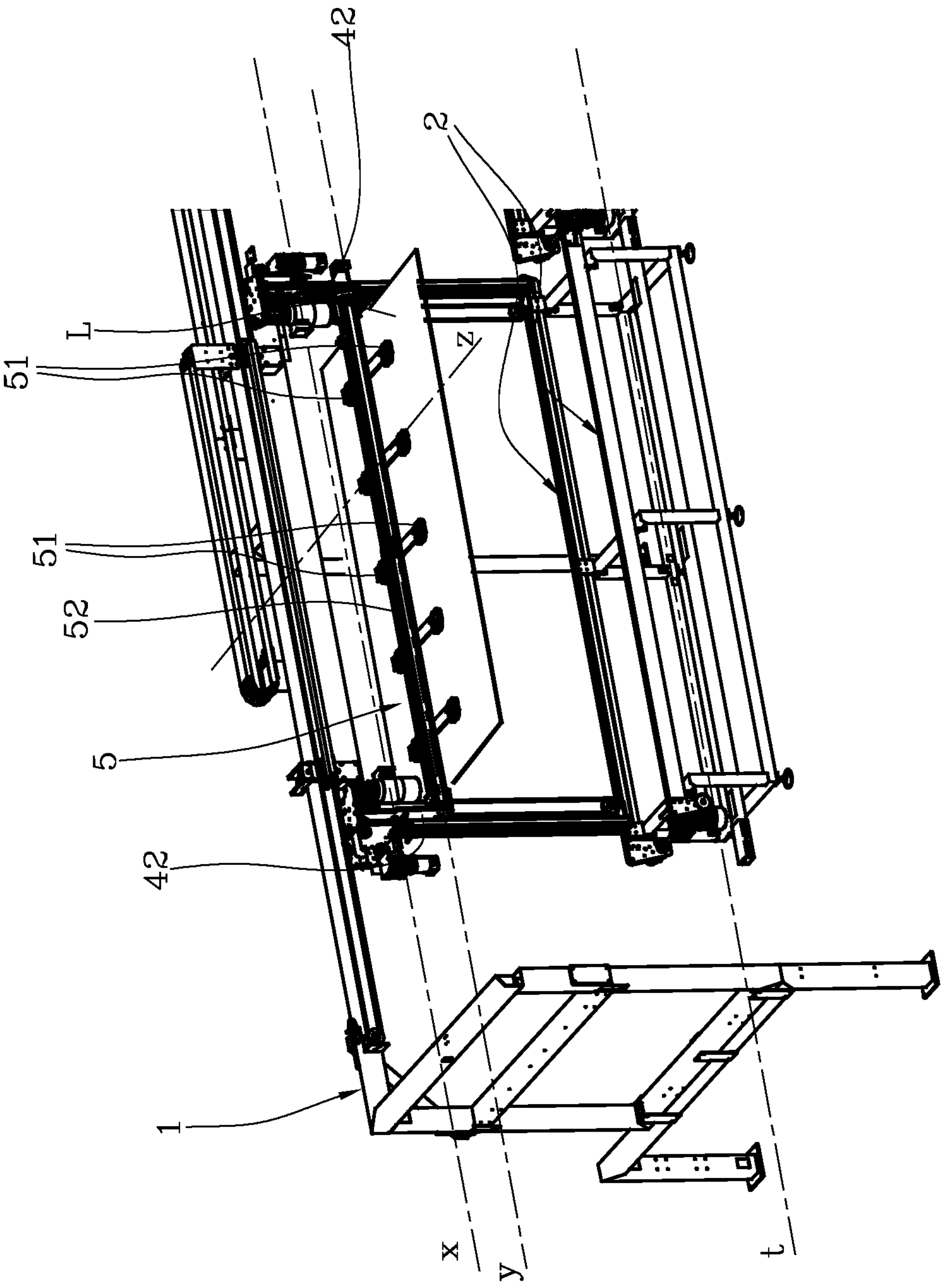
Figure 4:
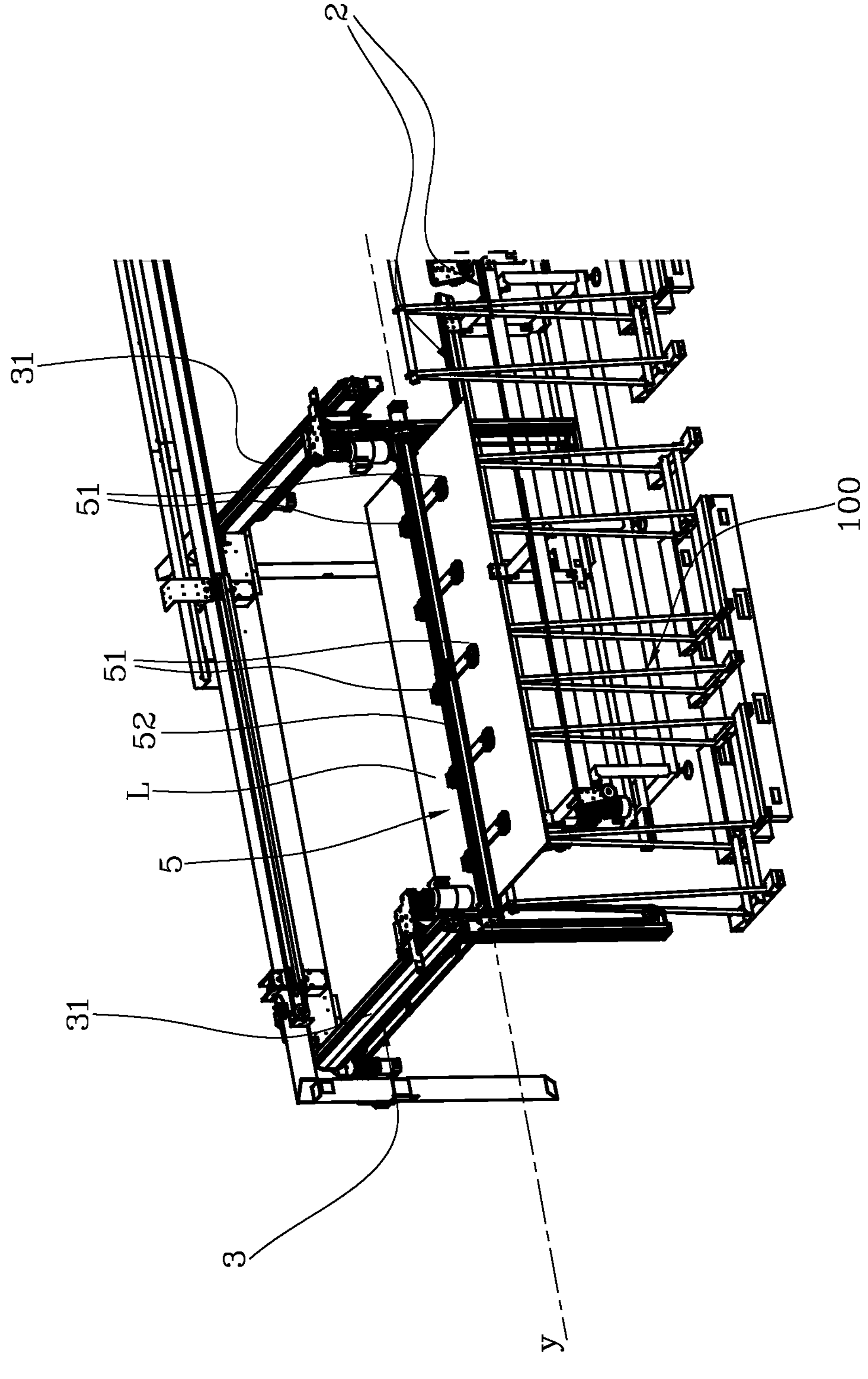
Figure 5:
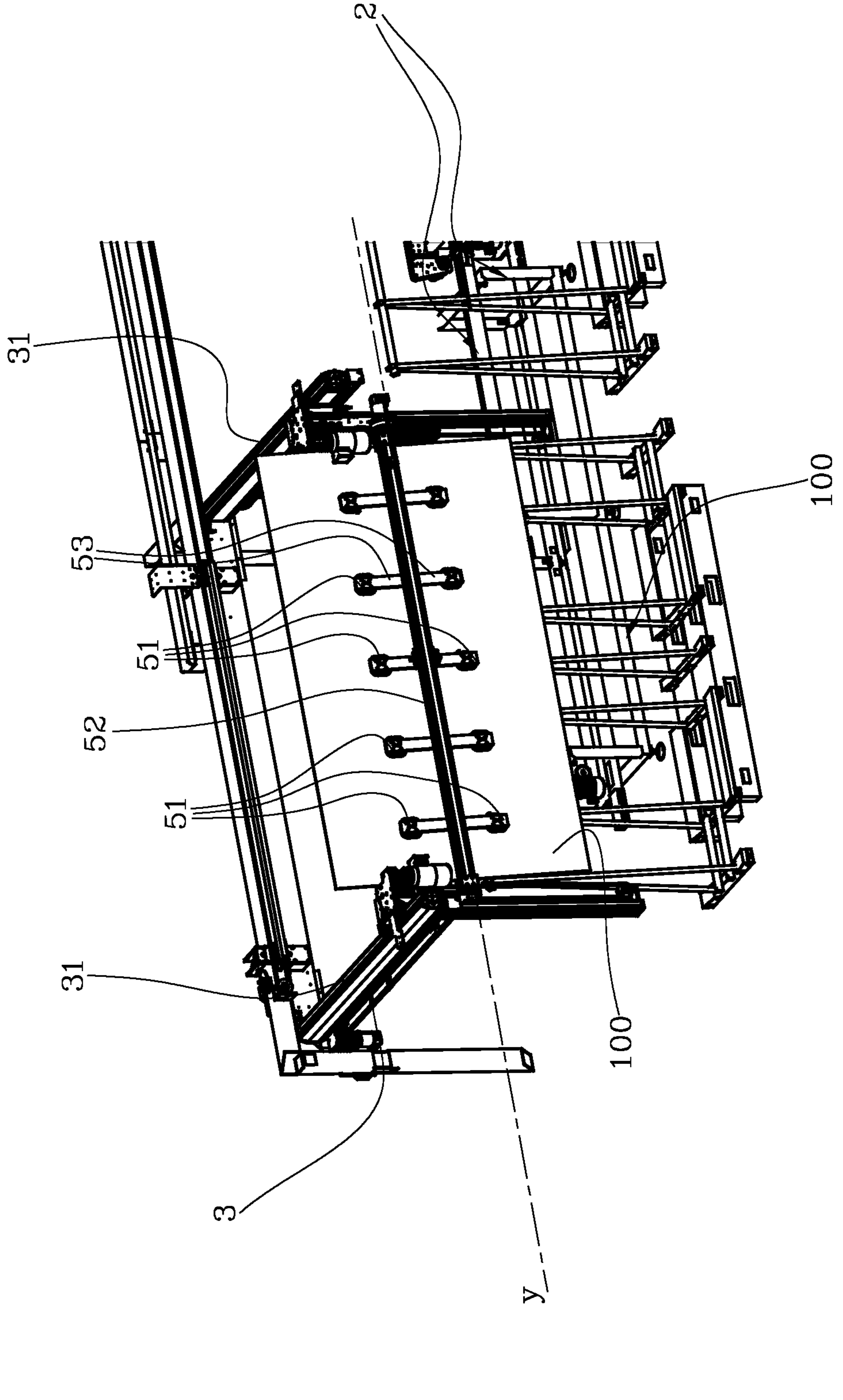
Figure 6:
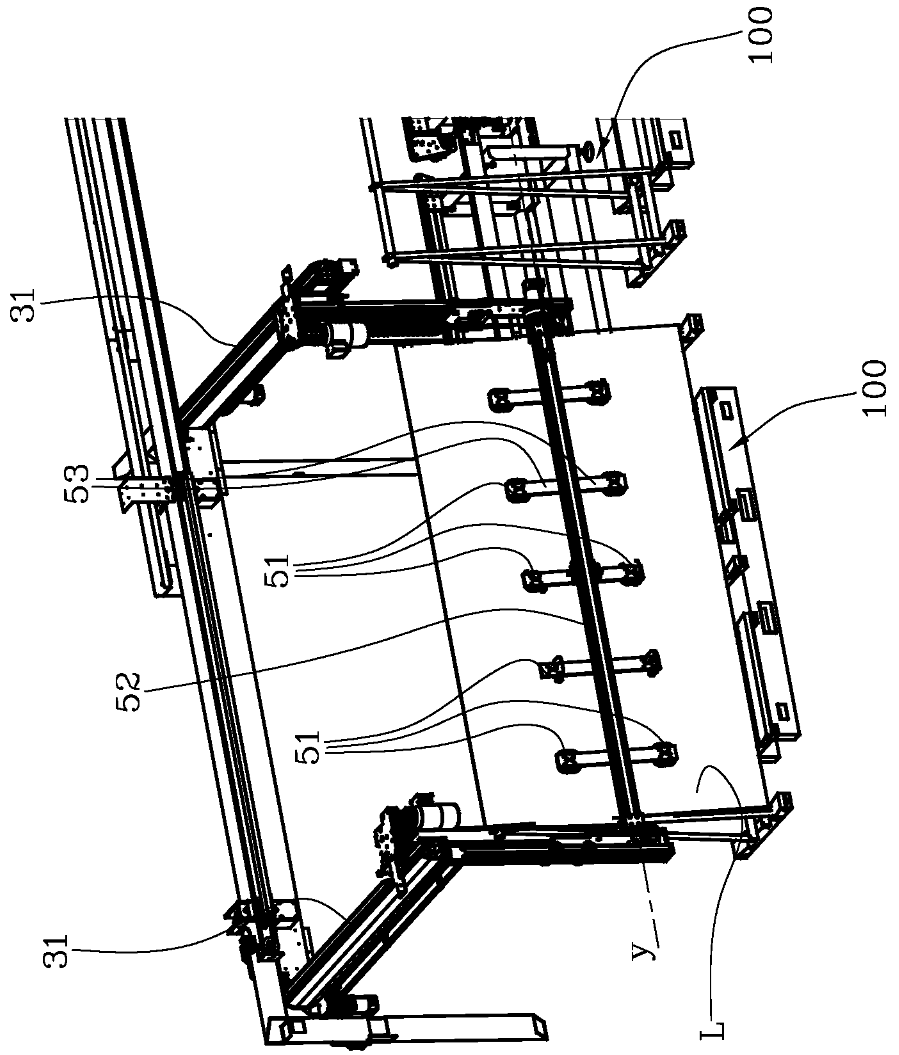
Figure 7:
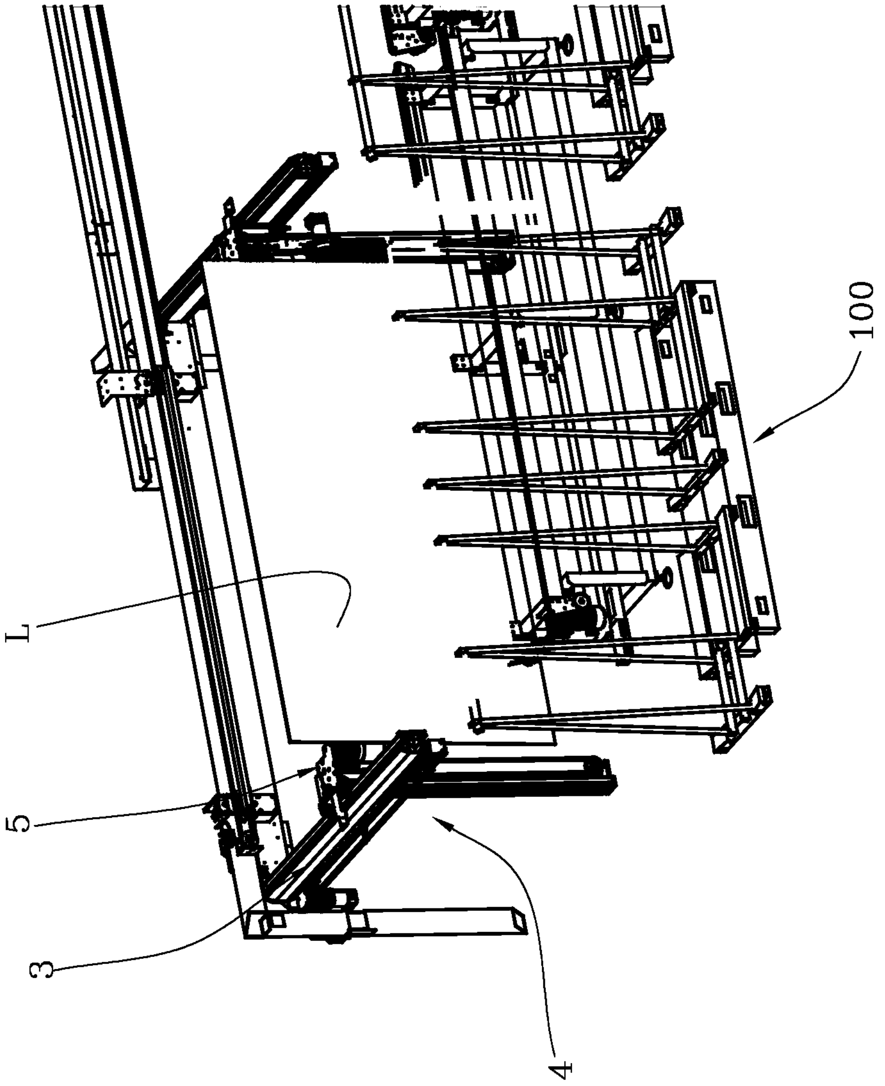
Figure 8:
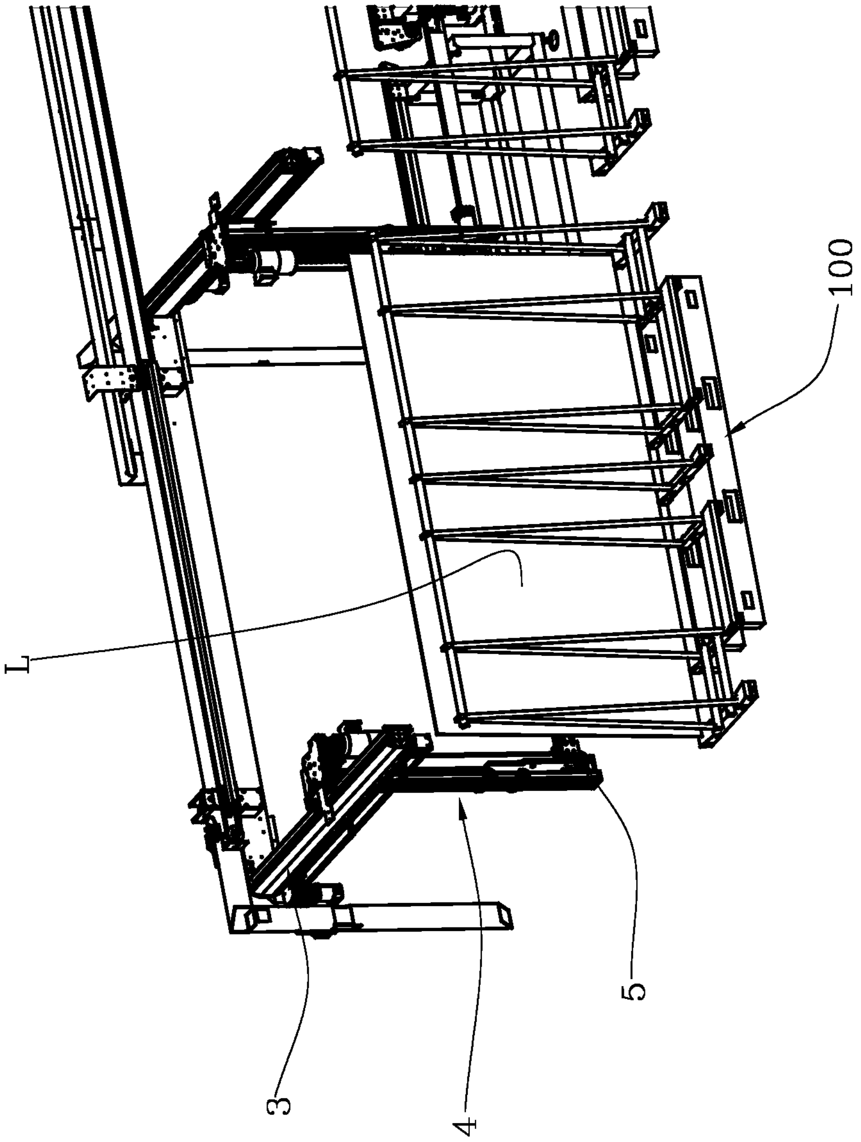

The combination of the possible movements allows the gripping device (5) to reach a position on the conveying plane (2), for picking up or releasing a slab (L), and a position where a sorting station (100) is present, for example at the edge or next to the conveying plane (2), for depositing or picking up a slab (L). For example, assuming starting from an initial position illustrated in FIG. 2, in which the gripping device (5) is positioned substantially above the conveying plane (2) for picking up a slab (L) resting on the conveying plane (2) in a horizontal position, it is possible to transfer the slab (L) to a sorting station (100) through a coordinated combination of the following movements, which can also take place simultaneously with each other, at least for some time intervals:

- movement of the carriage (3) along the sliding direction (X);
- vertical movement of the gripping device (5) by the elevator (4);
- movement of the gripping device (5) along the transverse direction (Z);
- rotation of the gripping device (5) about the rotation axis (Y).

In the typical operating cycle indicated above and represented in FIGS. 2 to 8, after having hooked a slab (L), the gripping device (5) follows an operating path from an initial position, on the conveying plane (2), to a final position, on a sorting station (100), which comprises at least one component for lifting from the conveying plane (2) followed by at least one component for lowering to a sorting station (100). In case of different placement of the sorting stations (100) with respect to the conveying plane, the lifting and lowering components of the operating path followed by the gripping device (5) could be inverted and/or be absent. During the operating path, or in a final step thereof, the gripping device (5) can be rotated about the rotation axis (Y).

In particular, it is possible to bring the slab (L) to a sorting station (100), by arranging the slab in an orientation different from the horizontal one assumed on the conveying plane (2) thanks to the possibility of rotation of the gripping device (5) around the rotation axis (Y). For example, considering a sorting station (100) comprising a stand, it is possible to orient the slabs (L) in a first unloading position, shown in FIGS. 5 and 6, useful for placing a slab (L) on one side of a stand (100), or in a second unloading position, specular to the first unloading position with respect to a vertical plane (FIGS. 7 and 8), useful for placing a slab (L) on the opposite side of the same stand (100). This obviously applies to all sorting stations.

The transfer of the slab (L) from the conveying plane (2) to the envisaged sorting station (100) takes place substantially at a higher level than the conveying plane (2), except for a final lowering of the slab (L) in order to be placed restingly on the envisaged sorting station (100).

In the depicted, preferred but not exclusive embodiment, the gripping device (5) comprises a cross member (52), that is substantially concentric to the rotation axis (Y), the ends of the cross member (52) being rotatably connected to the elevator (4). In practice, both ends of the cross member (52) are supported by the elevator (4), so that the cross member (52) is stably anchored to the elevator (4) with respect to the horizontally and vertically directed movements. The cross member (52) can rotate with respect to the elevator (4).

The gripping means (51) is associated with the cross member (52). In particular, the gripping means (51) has a gripping plane, intended to be positioned in contact with the surface of the object to be picked up, that is a slab (L) in the case depicted In particular, the gripping means (51) comprises a plurality of suction cups associated with the cross member (52). The suction cups have respective gripping surfaces, that is, surfaces intended to come into contact with and adhere to the object to be supported, in a manner well known in the sector. These active surfaces face in the same direction and lie on the gripping plane of the gripping means.

By rotating the cross member (52) about the rotation axis (Y), the gripping plane of the gripping means (51) rotates about the rotation axis (Y). This also allows a slab (L) supported by the gripping means (51) to be rotated, changing its orientation in space. For example, it is possible to pick up a slab (L) placed restingly on the conveying plane (2) in a horizontal position and, after lifting it, rotate the slab (L) in a preset angular position, to place it in a sorting station (100) provided with a stand of the type illustrated in the figures.

The cross member (52) rotates about the rotation axis (Y) by a motor, of a type known in the sector, supported by the elevator (4). In the depicted embodiment, the cross member (52) comprises a profiled bar or beam, which has attachment means for the suction cups. The latter are connected to the cross member (52) by means of respective arms (53). Preferably, the arms (53) can slide and be locked in variable positions along the rotation axis (Y). Furthermore, the suction cups can be placed along the respective arms (53) in variable positions transversely to the rotation axis (Y). This allows the suction cups to be positioned and/or spatially distributed optimally with respect to the sizes and the shape of the slabs (L).

In the depicted embodiment, the elevator (4) comprises a pair of uprights (41), solidly constrained to the carriage (3), and a pair of sliders (42), each of which is slidable along a respective upright (41). The uprights (41) are oriented vertically, so that the sliders (42) are slidable along a substantially vertical direction. Sliding guides are interposed between the sliders (42) and the uprights (41).

The gripping device (5) is associated with the sliders (42). In particular, the ends of the cross member (52) are associated with the sliders (42) in a rotating manner around the rotation axis (Y), by means of respective rotary joints known in the sector. The cross member (52) is thus supported at both ends, assuming a stable and rigid configuration. The rotation of the cross member (52) about the rotation axis (Y) is obtained by means of a motor, known in the sector, connected to at least one of the ends of the cross member (52), by means of a transmission known in the sector. Preferably, the motor is associated with the elevator (4), for example with one of the sliders (42).

In turn, the sliders (42) are slidable along the uprights (41) by at least one motor. Preferably, each slider (42) is slidable by a respective motor associated with the carriage (3).

Each motor is connected to the respective slider (42) by means of a kinematic mechanism known in the sector. In the depicted embodiment, the transmission connecting the motor to the slider thereof (42) comprises a belt (43) slidable around one or more return pulleys (44). At one end, each belt (43) is connected to a respective slider (42), while at the other end it is connected to a drum dragged into winding or unwinding rotation by the relative motor, to cause the lifting or the lowering of the slider (42). The two active motors on the sliders (42) are driven in synchronism, so that the sliders move synchronously and remain aligned on a horizontal plane.

By vertically moving the gripping device (5), obtained by means of the elevator (4), it is possible to bring the gripping means (51) to the height of the conveying plane (2), for picking up or releasing a slab (L), and to the height of the different sorting stations (100), for picking up or releasing a slab (L).

In the depicted, preferred but not exclusive embodiment, the movement of the gripping device (5) along the transverse direction (Z) is obtained by means of the movement of the elevator (4) along the transverse direction (Z).

In particular, the elevator (4) is associated with the carriage (3) with the possibility of translation along the transverse direction (Z). To this end, the uprights (41) are connected to the carriage (3) slidably along the transverse direction (Z).

The movement of the elevator (4) along the transverse direction (Z) allows the gripping device (5) to be positioned perpendicularly to the sliding direction (X) on a horizontal plane. This makes it possible to place the gripping device (5) between at least one position placed above the conveying plane (2), for picking up or releasing a slab (L), and at least one position placed laterally to the conveying plane (2), at an unloading station (100), for picking up or releasing a slab (L).

The carriage (3) is associated with a main frame (1) of the sorting machine, slidably along the sliding direction (X). The sliding of the carriage (3) is obtained by means of a motor, known in the sector.

In a manner known in the sector, the main frame (1) is structured for resting on the ground or on a baseplate. In the depicted embodiment, the main frame comprises two upper spars (11), arranged parallel to the sliding direction (X), to which the carriage (3) is slidably associated. Sliding guides are interposed between each spar (11) and the carriage (3). The upper spars (11) are supported by a plurality of vertical uprights, arranged to be anchored to the ground or to a baseplate. Additional cross members can be arranged to connect the uprights together, in case it is necessary to increase the rigidity of the main frame (1). Thanks to the sliding coupling with the upper spars (11), the carriage (3) is supported stably and precisely by the main frame (1).

The carriage (3) is therefore placed above the conveying plane (2), i.e. it is placed at a higher height than the conveying plane (2). The elevator (4) is arranged below the carriage (3). In particular, the uprights (41) are associated with the carriage (3) at one end, and extend vertically below the carriage (3).

The carriage (3) comprises a pair of cross members (31), arranged substantially horizontally and perpendicular to the sliding direction (X). The cross members (31) are connected to each other, at the ends, by two bars (32), arranged substantially parallel to the upper spars (11). The structure of the carriage (3) is therefore rigid and resistant.

Each upright (41) is associated with a respective cross member (31) slidably along the transverse direction (Z). In particular, each upright (41) is associated with the respective cross member (31) at one end, and extends vertically below the cross member (31) itself. Sliding guides are interposed between each upright (41) and the respective cross member (31). The sliding of each upright (41) along the respective cross member is obtained by means of a motor.

The sorting machine according to the present invention achieves important advantages.

Thanks to the configuration of the manipulator (M), it allows in fact to move the slabs (L) with considerable degrees of freedom, completely equivalent to those obtainable with an anthropomorphic robot arm. The structure of the manipulator (M) is also much lighter and more rigid than that of an anthropomorphic robot, as well as being considerably cheaper.

The invention claimed is:

1. A sorting machine for slabs, comprising:

a conveying plane (2), arranged to move slabs (L) along a conveying direction (t);

a manipulator device (M), arranged to grasp and release a slab (L), and to move the slab (L) between the conveying plane (2) and one or more sorting stations (100);

wherein the manipulator device (M) comprises:

a carriage (3) that is movable along a substantially horizontal sliding direction (X);

an elevator (4), associated with the carriage (3) and movable along a substantially vertical direction;

a gripping device (5), associated with the elevator (4), which is provided with a gripping means (51) for gripping at least one slab (L);

the gripping device (5) rotates around a substantially horizontal rotation axis (Y) and is movable along a transverse direction (Z) that is substantially horizontal and perpendicular to the sliding direction (X);

wherein the gripping device (5) comprises a cross member (52) that is substantially concentric to the rotation axis (Y), the ends of the cross member (52) being rotatably connected to the elevator (4);

wherein the cross member (52) comprises arms (53) transversally mounted on the cross member (52), wherein the arms (53) can slide and be locked in variable positions along the cross member (52).

2. The sorting machine according to claim 1, wherein the gripping means (51) is associated with the cross member (52).

3. The sorting machine according to claim 2, wherein the gripping means (51) comprises a plurality of suction cups associated with the cross member (52).

4. The sorting machine according to claim 1, wherein the cross member (52) rotates around the rotation axis (Y) by a motor supported by the elevator (4).

5. The sorting machine according to claim 1, wherein the elevator (4) comprises a pair of uprights (41), solidly constrained to the carriage (3), and a pair of sliders (42), each of which is slidable along a respective upright (41), and wherein the gripping device (5) is associated with the sliders (42).

6. The sorting machine according to claim 5, wherein the sliders (42) are slidable along the uprights (41) by at least one motor associated with the carriage (3).

7. The sorting machine according to claim 1, wherein the ends of the cross member (52) are associated with the sliders (42) in a rotating manner around the rotation axis (Y).

8. The sorting machine according to claim 1, comprising a main frame (1), structured to be supported on the ground or on a base plate with which the carriage (3) is associated slidably along the sliding direction (X).

9. The sorting machine according to claim 1, wherein the sliding direction (X) is substantially parallel to the conveying direction (t) and the rotation axis (Y) is substantially parallel to the sliding direction (X).

10. The sorting machine according to claim 1, wherein the gripping means (51) comprises a plurality of suction cups.

11. The sorting machine according to claim 10, wherein the plurality of suction cups can be placed in variable positions along the arms (53).

12. A sorting machine for slabs, comprising:

a conveying plane (2), arranged to move slabs (L) along a conveying direction (t);

a manipulator device (M), arranged to grasp and release a slab (L), and to move the slab (L) between the conveying plane (2) and one or more sorting stations (100);

characterized in that the manipulator device (M) comprises:

a carriage (3) that is movable along a substantially horizontal sliding direction (X) that is substantially parallel to the conveying direction (t);

an elevator (4), associated with the carriage (3) and movable along a substantially vertical direction;

a gripping device (5), associated with the elevator (4), which is provided with a gripping means (51) for gripping at least one slab (L);

the gripping device (5) rotates around a substantially horizontal rotation axis (Y) that is substantially parallel to the sliding direction (X) and is movable along a transverse direction (Z) that is substantially horizontal and perpendicular to the sliding direction (X)

wherein the carriage (3) is arranged above the conveying plane (2) and the gripping device (5) is movable along the transverse direction (Z) over the conveying plane (2), wherein the gripping device (5) comprises a cross member (52) that is substantially concentric to the rotation axis (Y), the ends of the cross member (52) being rotatably connected to the elevator (4);

wherein the cross member (52) comprises arms (53) transversally mounted on the cross member (52) and the arms (53) can slide and be locked in variable positions along the cross member (52).

13. A sorting machine for slabs, comprising:

a conveying plane (2), arranged to move slabs (L) along a conveying direction (t);

a manipulator device (M), arranged to grasp and release a slab (L), and to move the slab (L) between the conveying plane (2) and one or more sorting stations (100);

wherein the manipulator device (M) comprises:

a carriage (3) that is movable along a substantially horizontal sliding direction (X);

an elevator (4), associated with the carriage (3) and movable along a substantially vertical direction;

a gripping device (5), associated with the elevator (4), which is provided with a gripping means (51) for gripping at least one slab (L);

the gripping device (5) rotates around a substantially horizontal rotation axis (Y) and is movable along a transverse direction (Z) that is substantially horizontal and perpendicular to the sliding direction (X);

wherein the gripping device (5) comprises a cross member (52) that is substantially concentric to the rotation axis (Y), the ends of the cross member (52) being rotatably connected to the elevator (4);

wherein the sorting stations (100) are placed next to the conveying plane (2) such that the sorting stations (100) are substantially within an overall dimension lengthwise of the conveying plane (2);

wherein the overall dimension lengthwise of the conveying plane (2) is measured along the conveying direction (t).

* * * * *